US007623023B2

(12) United States Patent
Shih

(10) Patent No.: US 7,623,023 B2
(45) Date of Patent: Nov. 24, 2009

(54) PRESENTATION CONTROLLING DEVICE

(75) Inventor: Tzu-Chiang Shih, Taipei (TW)

(73) Assignee: Primax Electronics Ltd., Taipei (TW)

( * ) Notice: Subject to any disclaimer, the term of this patent is extended or adjusted under 35 U.S.C. 154(b) by 343 days.

(21) Appl. No.: 11/673,401

(22) Filed: Feb. 9, 2007

(65) Prior Publication Data

US 2008/0115058 A1 May 15, 2008

(30) Foreign Application Priority Data

Nov. 13, 2006 (TW) .............................. 95141857 A

(51) Int. Cl.
*G08B 1/00* (2006.01)
*G09G 5/00* (2006.01)
*G06F 3/00* (2006.01)

(52) U.S. Cl. ............ 340/309.7; 340/309.8; 340/309.16; 340/825.72; 345/156; 715/730; 715/732

(58) Field of Classification Search .............. 340/309.7, 340/825.72, 309.16, 309.8, 309.9; 345/156, 345/99; 715/700, 705, 710, 730, 732
See application file for complete search history.

(56) References Cited

U.S. PATENT DOCUMENTS

2003/0090472 A1* 5/2003 Im .............................. 345/172
2004/0178987 A1* 9/2004 Chen et al. .................. 345/156
2005/0128180 A1* 6/2005 Wang .......................... 345/156
2005/0248528 A1* 11/2005 Karcher et al. .............. 345/156

* cited by examiner

*Primary Examiner*—Toan N Pham
(74) *Attorney, Agent, or Firm*—Kirton & McConkie; Evan R. Witt

(57) ABSTRACT

A presentation controlling device includes a presentation controller, wireless transceiver and a timer program. The presentation controller includes a warning module. The timer program is installed in the computer. The timer program is executed to provide a presentation time control interface and issue a remaining time alert signal to the presentation controller. In response to the remaining time alert signal, the warning module is enabled to issue the warning signal.

5 Claims, 1 Drawing Sheet

PRESENTATION CONTROLLING DEVICE

FIELD OF THE INVENTION

The present invention relates to a presentation controlling device, and more particularly to a presentation controlling device having a timer program installed in a computer for issuing a remaining time alert signal.

BACKGROUND OF THE INVENTION

Nowadays, computers become essential electronic devices for making a presentation in a meeting. During the process of making a presentation, it is difficult for the lecturers to control the length of the presentation. Most lecturers may be unconscious that the presentation has been continued over a preset time period. As known, a lengthy presentation renders the meeting inefficient. For controlling the presentation on schedule, the lecturer need to frequently monitor the clock in the conference room or the watch worn on his hand. Otherwise, the lecturer should be alerted by someone during the presentation.

For controlling presentation, a presentation controlling device is disclosed in US Patent Application No. 20050248528, entitled "Time management in presentation device". The presentation controlling device includes a timer module, a display module, a timer button and an alert module. By activating the timer button, the user may set the preset presentation time interval into the presentation controlling device. When the timer button is pressed for each time, a preset presentation time interval between a current time and an end time is increased by a preset time increment, e.g. 15 minutes. For example, if the user presses the timer button once, the preset presentation time interval is 15 minutes. If the user presses the timer button twice, the preset presentation time interval is 30 minutes. The information associated with the preset presentation time interval is shown on the display module. After the presentation starts, the display module shows a countdown of the time interval from the initial time to the end time to show the remaining presentation time. In addition, when the remaining presentation time has reached a certain level, the alert module may alert the user.

Although the presentation controlling device may alert the user of the remaining presentation time, there are still some drawbacks. For example, as previously described, the preset presentation time interval is set by activating the timer button. Since the preset presentation time interval is increased by a preset time increment when the timer button is pressed for each time, this process is troublesome. In a case that the preset time increment is 15 minutes, the preset presentation time interval should be equal to a multiple of 15 minutes, e.g. 15, 30, 45 minutes, and so on. Generally, the preset presentation time interval may be less than 15 minutes (e.g. 5 or 10 minutes) or much greater than 15 minutes. For example, if the preset presentation time interval is 150 minutes, the user should continuously press the timer button for several times. Therefore, the conventional presentation controlling device is not suitable for making a presentation requiring a very large preset presentation time interval.

SUMMARY OF THE INVENTION

It is an object of the present invention to provide a presentation controlling device having a timer program installed in a computer for issuing a time alert signal so as to establish time settings as required and enhance cost-effectiveness.

In accordance with an aspect of the present invention, there is provided a presentation controlling device for controlling a presentation producing routine of a computer. The presentation controlling device includes a presentation controller, a second wireless transceiver and a timer program. The presentation controller includes a main body, a plurality of buttons, a microprocessor, a first wireless transceiver, a laser pointer and a warning module. The buttons are arranged on the main body and triggered to execute corresponding presentation producing instructions. The microprocessor is arranged within the main body for generating corresponding presentation control signals according to the presentation producing instructions. The first wireless transceiver is arranged within the main body for transmitting the presentation control signals to the computer. The laser pointer is arranged within the main body for generating a laser beam. The warning module is arranged within the main body for generating a warning signal. The second wireless transceiver is communicated with the computer for receiving and transmitting the presentation control signals to the computer. The timer program is installed in the computer. The timer program is executed to provide a presentation time control interface on the computer and issue a remaining time alert signal to the presentation controller. The warning module is enabled to issue the warning signal in response to the remaining time alert signal.

Preferably, the warning module is a vibrator, a loudspeaker or a light emitting diode.

In an embodiment, the timer program is executed to set a preset presentation time interval via the presentation time control interface, set a preset remaining time via the presentation time control interface, and issue the remaining time alert signal to the presentation controller according to the preset presentation time interval and the preset remaining time.

In accordance with another aspect of the present invention, there is provided a presentation alert method for generating a remaining time alert signal in a presentation producing routine. The presentation alert method includes steps of setting a preset presentation time interval and a preset remaining time in a computer for making a presentation, issuing a remaining time alert signal to a presentation controller according to the preset presentation time interval and the preset remaining time, and generating a warming signal by the presentation controller in response to the remaining time alert signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
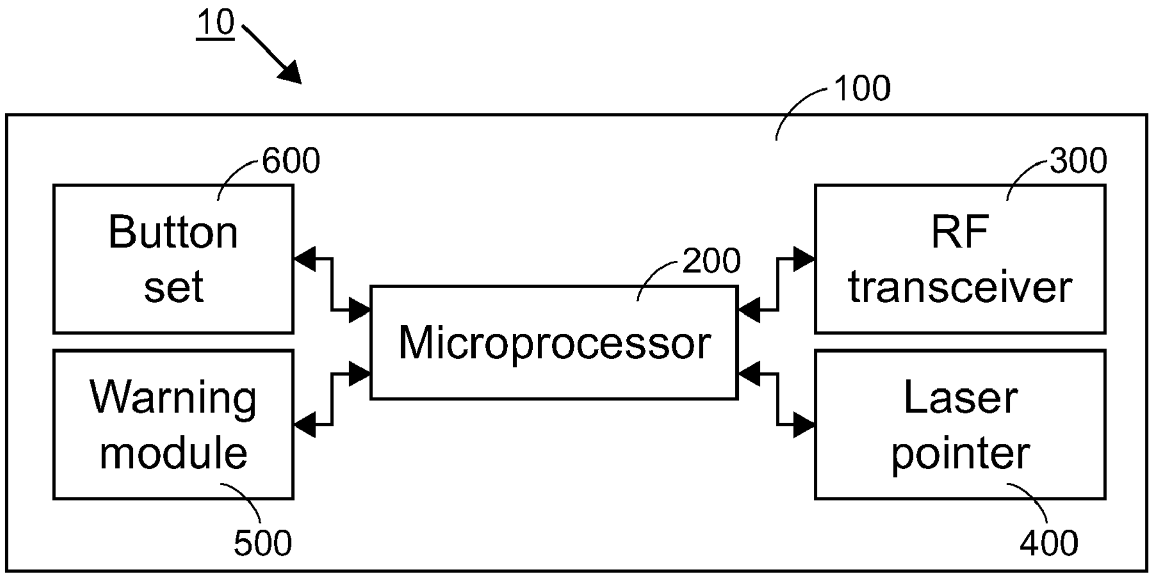
FIG. 1A is a schematic block diagram of a presentation controller according to a preferred embodiment of the present invention.

Referring to FIG. 1A, a schematic block diagram of a presentation controller according to a preferred embodiment of the present invention. As shown in FIG. 1A, the presentation controller 10 includes a main body 100, a microprocessor 200, a radio frequency (RF) transceiver 300, a laser pointer 400, a warning module 500 and a button set 600.

Figure 1B:
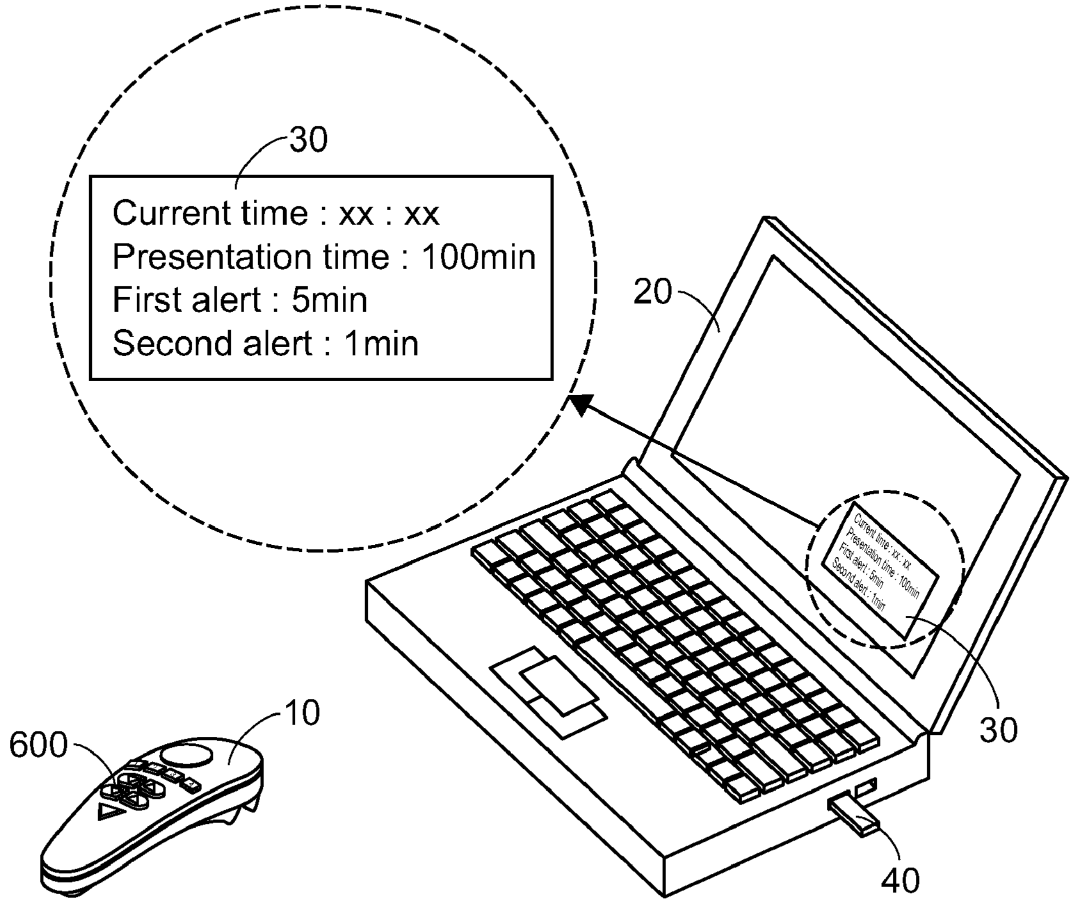
FIG. 1B illustrates an application example of the presentation controlling device of the present invention.

Referring to FIG. 1B, an application example of the presentation controlling device of the present invention is schematically illustrated. In accordance with a specific feature of the present invention, a timer program has been installed in a computer 20. In response to execution of the timer program, a presentation time control interface 30 is shown on the computer 20. Moreover, the presentation controlling device includes a wireless signal transceiver 40 for transmitting/receiving a wireless signal to/from the RF transceiver 300 of the presentation controller 10.

Hereinafter, an embodiment of the operation of the presentation controlling device according to the present invention will be illustrated with reference to FIG. 1A and FIG. 1B.

First of all, via the RF transceiver 300, the information associated with the preset presentation time interval and the alert time is inputted. For example, the preset presentation time interval is 100 minutes. In some embodiments, the user is notified when the remaining time reaches a first preset remaining time (e.g., 5 minutes), and then notified again when the remaining time reaches a second preset remaining time (e.g., 1 minutes).

After the time settings of presentations are set, a presentation producing routine is performed by operating the presentation controller 10. When an actuating button on the presentation controller 10 is pressed down, a triggering signal is issued from the presentation controller 10 and transmitted to the computer 20. In response to the triggering signal, the timer program in the computer 20 is executed to start counting time. The button set 600 includes several buttons, which are activated to control proceeding of the presentation. For example, a next slide is displayed when a "next" button is pressed down, and a previous slide is displayed when a "previous" button is pressed down. When one of the buttons of the button set 600 is pressed down, a corresponding control signal is issued from the microprocessor 200 to the computer 20. By using the laser pointer 400, the lecturer may project a marking point onto the screen while making a presentation.

When the remaining time reaches the first preset remaining time (5 minutes), the timer program is executed to issue a first alert signal to the presentation controller 10. In response to the alert signal, the microprocessor 200 of the presentation controller 10 enables the warning module 500 to issue a warning signal. An exemplary warning module 500 includes a vibrator, a loudspeaker or a light emitting diode. In a case that the warning module 500 is a vibrator, a vibrating action of the presentation controller 10 denotes the warning signal. In a case that the warning module 500 is a loudspeaker, the presentation controller 10 generates a sound prompt. In a case that the warning module 500 is a light emitting diode, the presentation controller 10 emits light to notify the user that the end time of the presentation is approaching. Likewise, when the remaining time reaches the second preset remaining time (1 minute), the timer program is executed to issue a second alert signal to the presentation controller 10.

In the above embodiments, the remaining time alert signals are generated by executing the timer program installed in the computer. As a consequence, the preset presentation time interval and the preset remaining time can be set via the presentation time control interface shown on the computer. That is, the related time settings are determined as required. Moreover, since the timer program is software without increasing the overall volume of the presentation system. Therefore, the presentation controlling device of the present invention is more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A presentation controlling device for controlling a presentation producing routine of a computer, said presentation controlling device comprising:

a presentation controller including:

a main body;

a plurality of buttons arranged on said main body and triggered to execute corresponding presentation producing instructions;

a microprocessor arranged within said main body for generating corresponding presentation control signals according to said presentation producing instructions;

a first wireless transceiver arranged within said main body for transmitting said presentation control signals to said computer;

a laser pointer arranged within said main body for generating a laser beam; and a warning module arranged within said main body for generating a warning signal;

a second wireless transceiver communicated with said computer for receiving and transmitting said presentation control signals to said computer; and a timer program installed in said computer and executed to provide a presentation time control interface on said computer and issue a remaining time alert signal to said presentation controller, wherein said warning module is enabled to issue said warning signal in response to said remaining time alert signal.

2. The presentation controlling device according to claim 1 wherein said warning module is a vibrator, a loudspeaker or a light emitting diode.

3. The presentation controlling device according to claim 1 wherein said timer program is executed to set a preset presentation time interval via said presentation time control interface, set a preset remaining time via said presentation time control interface, and issue said remaining time alert signal to said presentation controller according to said preset presentation time interval and said preset remaining time.

4. A presentation alert method for generating a remaining time alert signal in a presentation producing routine of a computer, said presentation alert method comprising steps of:

setting a preset presentation time interval and a preset remaining time in the computer producing the presentation;

issuing a remaining time alert signal to a presentation controller according to said preset presentation time interval and said preset remaining time; and generating a warning signal by said presentation controller in response to the remaining time alert signal.

5. The presentation alert method according to claim 4 wherein said warning module is a vibrator, a loudspeaker or a light emitting diode.

* * * * *